United States Patent
Nagayama et al.

(10) Patent No.: US 7,548,951 B2
(45) Date of Patent: Jun. 16, 2009

(54) MINUTE FILE CREATION METHOD, MINUTE FILE MANAGEMENT METHOD, CONFERENCE SERVER, AND NETWORK CONFERENCE SYSTEM

(75) Inventors: Hironori Nagayama, Tokyo (JP); Mitsuyoshi Amano, Tokyo (JP); Keiji Suginohara, Tokyo (JP)

(73) Assignee: Pioneer Corporation, Tokyo (JP)

( * ) Notice: Subject to any disclaimer, the term of this patent is extended or adjusted under 35 U.S.C. 154(b) by 750 days.

(21) Appl. No.: 11/065,289

(22) Filed: Feb. 25, 2005

(65) Prior Publication Data

US 2005/0228861 A1    Oct. 13, 2005

(30) Foreign Application Priority Data

Feb. 25, 2004    (JP)    ............................. P2004-050553

(51) Int. Cl.
  *G06F 15/16*    (2006.01)
(52) U.S. Cl. ........................ 709/204; 709/203; 709/205; 370/260; 715/753
(58) Field of Classification Search ......... 709/203–205, 709/231, 236; 370/259–260; 715/751–753
  See application file for complete search history.

(56) References Cited

U.S. PATENT DOCUMENTS

| | | | | |
|---|---|---|---|---|
| 5,617,539 A | * | 4/1997 | Ludwig et al. | 709/205 |
| 5,768,514 A | * | 6/1998 | Kamei | 709/205 |
| 6,343,313 B1 | * | 1/2002 | Salesky et al. | 709/204 |
| 6,377,995 B2 | * | 4/2002 | Agraharam et al. | 709/203 |
| 6,816,904 B1 | * | 11/2004 | Ludwig et al. | 709/204 |
| 7,143,231 B1 | * | 11/2006 | Srinivasan et al. | 711/108 |
| 7,313,593 B1 | * | 12/2007 | Pulito et al. | 709/204 |
| 7,426,192 B2 | * | 9/2008 | Amano et al. | 709/203 |
| 2005/0180341 A1 | * | 8/2005 | Nelson et al. | 370/260 |
| 2005/0198123 A1 | | 9/2005 | Nagayama et al. | |

FOREIGN PATENT DOCUMENTS

| | | | |
|---|---|---|---|
| JP | 7-182365 A | 7/1995 | |
| JP | 10-294798 A | 11/1998 | |

\* cited by examiner

*Primary Examiner*—Bharat N Barot
(74) *Attorney, Agent, or Firm*—Sughrue Mion, PLLC

(57) ABSTRACT

In a server-client network conference system having a conference server 100 and a plurality of conference terminals 140a to 140n through a network 130, a conference data storage section 120 creates a real-time conference data file 123 and an index file 122 containing time-of-day information and heading information while a conference proceeds. After the conference is over, edit such as voice stream merge processing, image thinning-out processing, etc., in the real-time conference data file 123 is performed to create a minute file 124 and the minute file 124 is managed with an index file 122.

7 Claims, 11 Drawing Sheets

MINUTE FILE CREATION METHOD, MINUTE FILE MANAGEMENT METHOD, CONFERENCE SERVER, AND NETWORK CONFERENCE SYSTEM

The present disclosure relates to the subject matter contained in Japanese Patent Application No. 2004-050553 filed on Feb. 25, 2004, which is incorporated herein by reference in its entirety.

BACKGROUND OF THE INVENTION

1. Field of the Invention

This invention relates to a minute file creation method, a minute file management method, a conference server, and a network conference system.

2. Description of the Related Art

In an electronic conference system, the description of an electronic conference (multimedia data) is saved, whereby it is made possible to later reproduce the conference description.

However, it is inefficient to check all of the saved conference data after the conference. There is described in JP-A-7-182365 that minutes provided by editing the description of an electronic conference are created and when the minutes are created, a minute creation support apparatus is used.

There is described in JP-A-10-294798 that voice information of conference participants is analyzed using voice recognition technology and is converted into text information and text minutes are created automatically.

SUMMARY OF THE INVENTION

In JP-A-7-182365, minute data is separated into video information, voice information, text information, and drawing information for storage, but the information amount of the multimedia data is large and the files become giant. Therefore, an enormous record area becomes necessary.

To read the minute data from a remote location through a network, the transmission amount becomes enormous and load is imposed on a playback apparatus and the system burden becomes heavy.

Although support of the minute creation support apparatus is provided, considerable labor and time are taken for creating the minutes.

The disclosure of JP-A-10-294798 is predicated on creation of text minutes. Therefore, the system described in JP-A-10-294798 does not give any solutions to the above-described problems occurring with regard to minute creation based on multimedia information (namely, problems of enormous saved data and the difficulty of transmitting the data to a remote location).

It is one of objects of the invention to efficiently reduce the data amount of the minutes of multimedia information, lessen the burden of transmission to a remote location, realize automatic creation of a minute file and efficient access to the minute file, and improve the ease-of-use of a network conference system.

According to a first aspect of the invention, there is provided a minute file creation method including: adding a time stamp to conference data containing voice data, image data, and control command data of a real-time conference held using a network conference system; placing the data on time series to create a real-time conference data file; temporarily storing the real-time conference data file; reading the temporarily stored real-time conference data file after the real-time conference is over; packaging voice stream data of participants of the real-time conference into one stream data; executing image thinning-out processing of the image data of the participants; and compressing the provided voice stream data, the image data after being subjected to the image thinning-out processing, and the control command data to create a minute file.

According to a second aspect of the invention, there is provided a minute file management method including: adding a time stamp to conference data containing voice data, image data, and control command data of a real-time conference held using a network conference system; placing the data on time series to create a real-time conference data file; temporarily storing the real-time conference data file; creating an index file including time-of-day information, heading information, and reference destination information in which they are associated with each other; reading the temporarily stored real-time conference data file after the real-time conference is over; packaging voice stream data of participants of the real-time conference into one stream data; executing image thinning-out processing of the image data of the participants; compressing the provided voice stream data, the image data after being subjected to the image thinning-out processing, and the control command data to create a minute file; storing the created minute file; and managing access to the minute file using the index file.

According to a third aspect of the invention, there is provided a conference server used in a server-client network conference system, the conference server including: a data storage section; and a playback control section, wherein the data storage section includes: a real-time conference data file creation section for adding a time stamp to conference data containing voice data, image data, and control command data of a real-time conference held using a network conference system, and placing the data on time series to create a real-time conference data file; an index file creation section for creating an index file including time-of-day information, heading information, and reference destination information in which they are associated with each other concurrently with creation of the real-time conference data file; and a conference data edit section for reading the temporarily stored real-time conference data file after the real-time conference is over, packaging voice stream data of participants of the real-time conference into one stream data, executing image thinning-out processing of the image data of the participants, and compressing the provided voice stream data, the image data after being subjected to the image thinning-out processing, and the control command data to create a minute file, wherein the playback control section, upon reception of a request for playing back the minute file from a conference terminal as a client, creates a heading list based on the heading information in the index file, and transmits the heading list to the conference terminal, and wherein the playback control section, when a user of the conference terminal specifies a specific heading as the result of referencing the heading list, reads data in the minute file corresponding to the specified heading by referring to the index file, and transmits the read data to the conference terminal.

According to a fourth aspect of the invention, there is provided a network conference system including: a conference server; and a conference terminal connected to the conference server through a network and serves as a client, wherein the conference server includes a data storage section and a playback control section, wherein the data storage section includes: a real-time conference data file creation section for adding a time stamp to conference data containing voice data, image data, and control command data of a real-time conference held using a network conference system, and placing the data on time series to create a real-time conference data file; an index file creation section for creating an index file including time-of-day information, heading information, and reference destination information in which they are associated with each other concurrently with creation of the real-time conference data file; and a conference data edit section for reading the temporarily stored real-time conference data file after the real-time conference is over, packaging voice stream data of participants of the real-time conference into one stream data, executing image thinning-out processing of the image data of the participants, and compressing the provided voice stream data, the image data after being subjected to the image thinning-out processing, and the control command data to create a minute file, wherein the playback control section, upon reception of a request for playing back the minute file from the conference terminal, creates a heading list based on the heading information in the index file, and transmits the heading list to the conference terminal, and wherein the playback control section, when a user of the conference terminal specifies a specific heading as the result of referencing the heading list, reads data in the minute file corresponding to the specified heading by referring to the index file, and transmits the read data to the conference terminal.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Referring now to the accompanying drawings, there are shown preferred embodiments of the invention.

First Embodiment

Figure 1:
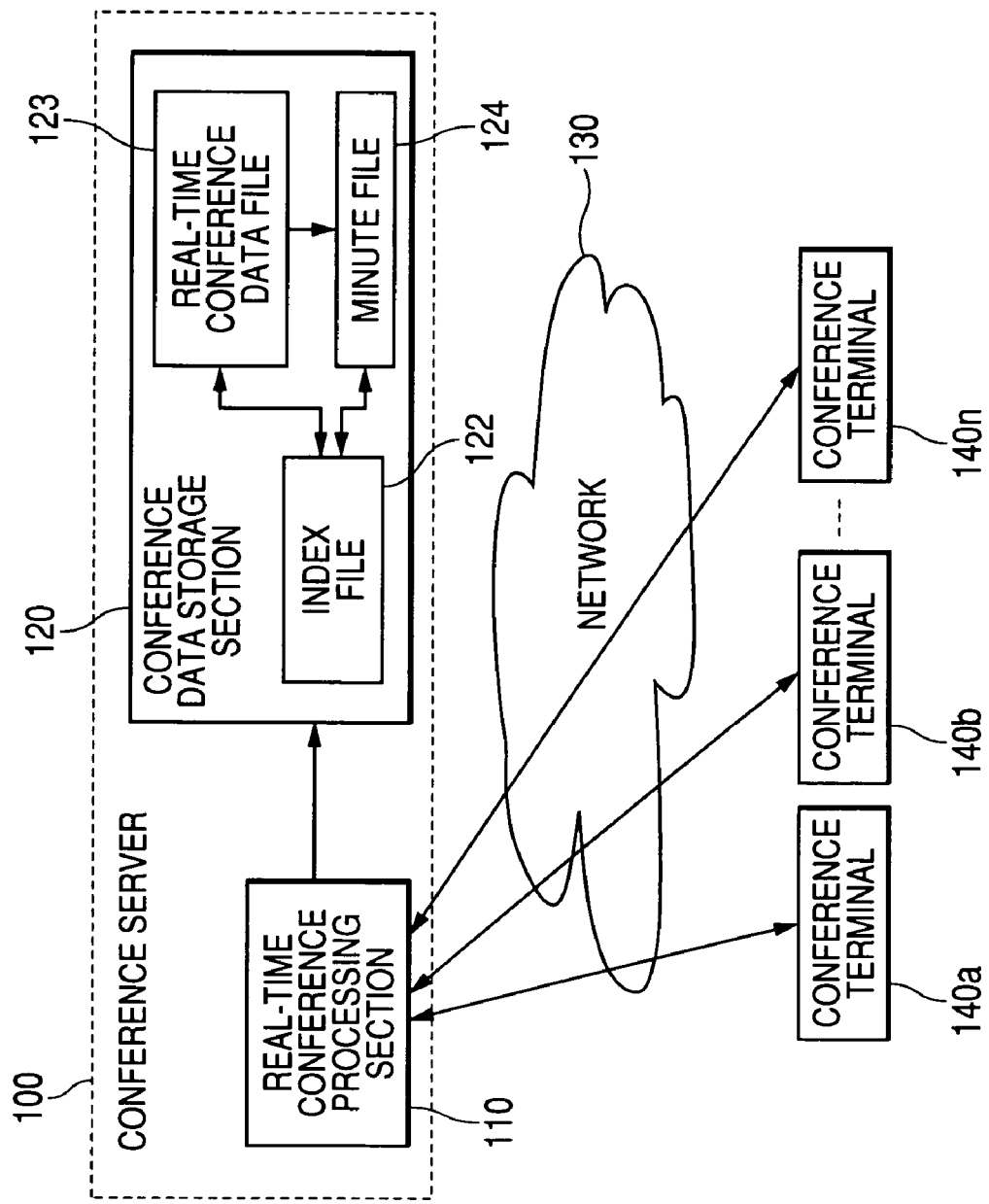
FIG. 1 is a block diagram to describe the characteristic configuration of a network conference system according to a first embodiment of the invention and an outline of the record operation of various files.
Figure 2:
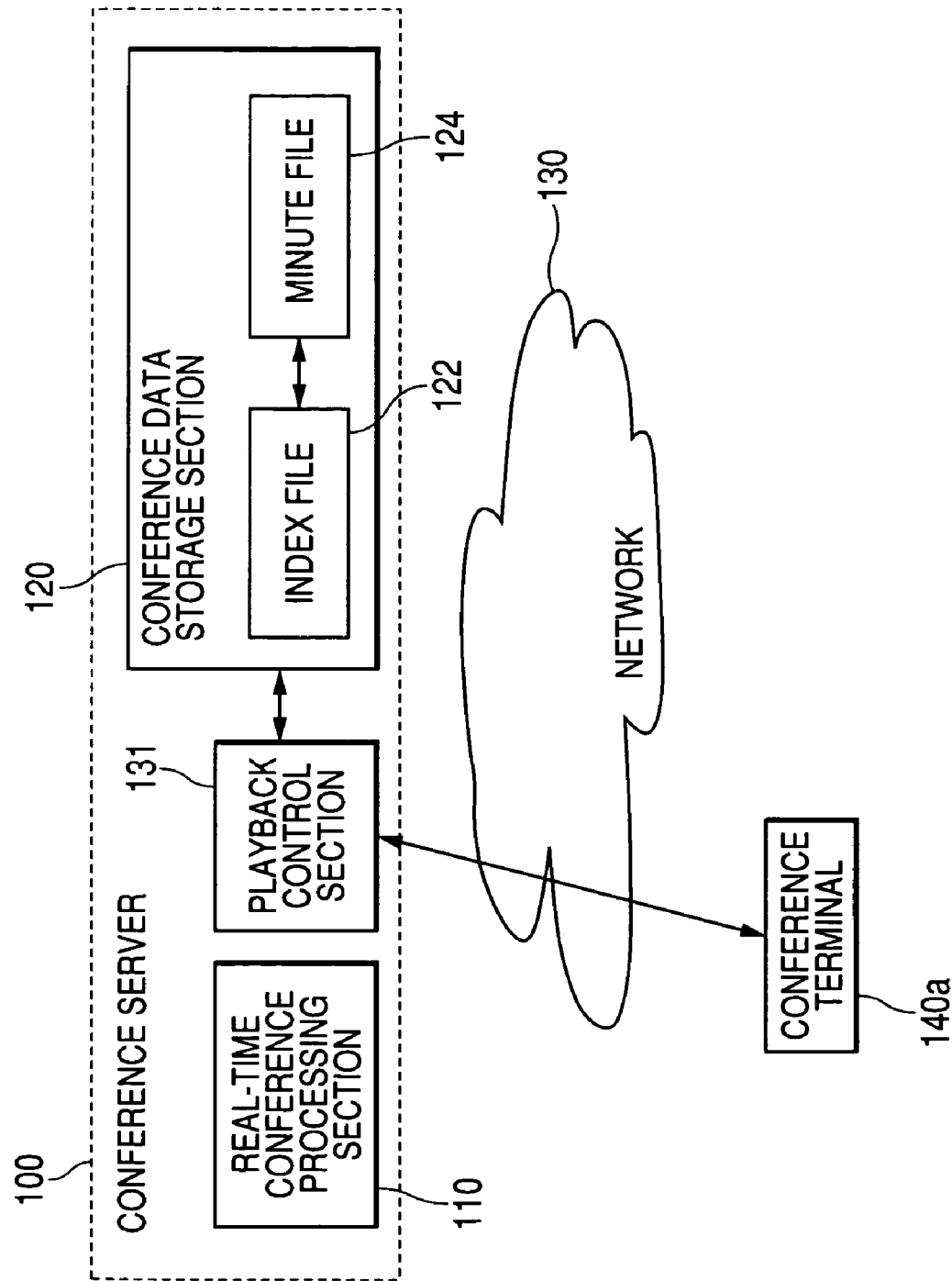
FIG. 2 is a drawing to describe an outline of the operation at the playback time of a minute file.

FIG. 1 is a block diagram to describe the characteristic configuration of a network conference system according to a first embodiment of the invention and an outline of the record operation of various files. FIG. 2 is a drawing to describe an outline of the operation at the playback time of a minute file.

As shown in FIG. 1, the network conference system according to the first embodiment of the invention is a server-client system having a plurality of conference terminals 140a to 140n connected to a conference server 100 through a network 130.

The conference server 100 has a real-time conference processing section 110 for performing centralized processing of multimedia data occurring in a real-time conference and a conference data storage section 120 for storing real-time conference data (multimedia data) at any time.

The conference data storage section 120 temporarily saves the conference data (multimedia data) of a real-time conference as a real-time conference data file 123 and performs edit processing after the conference terminates for converting the real-time conference data file 123 into a minute file 124 reduced in data size and saves the minute file 124.

The conference data storage section 120 also creates an index file 122 during the conference to make it possible to efficiently access the minute file 124.

The index file 122 contains heading (chapter) information and access information to the conference data (real-time conference data file 123 and minute file 124) in addition to time-of-day information.

The conference participants make a conference reservation at the conference server 100 and when the conference start time is reached, they access the conference server 100 from the conference terminals 140a to 140n to take part in the conference and transmit and receive conference data to and from the real-time conference processing section 110.

The real-time conference data is sent to the conference data storage section 120 at any time and is temporarily stored as the real-time conference data file 123. The index file 122 is also created and saved concurrently with creation of the real-time conference data file 123.

Next, the operation at the playback time of a minute file will be discussed with FIG. 2. Here, it is assumed that the user of the conference terminal 140a wants to play back the minute file.

As shown in FIG. 2, the conference terminal 140a transmits a playback request to a playback control section 131 in the conference server 100. The playback control section 131 references the index file 122, creates a heading list, and sends the heading list to the conference terminal 140a.

The user of the conference terminal 140a references the sent heading list and specifies his or her desired heading.

Then, the real-time conference data file 123 on and after the point in time corresponding to the heading is read and is sent to the conference terminals 140a to 140n, and the conference data is played back on each conference terminal.

The index file 122 substantially serves as minutes and is automatically created during the conference, so that saving in the time and labor for creating minutes after the conference can be accomplished.

As the index file 122 is referenced, the real-time conference data file 123 can be accessed efficiently and any desired part of the conference data can be played back. Therefore, the effective use of the saved real-time conference data file can be made.

Figure 3:
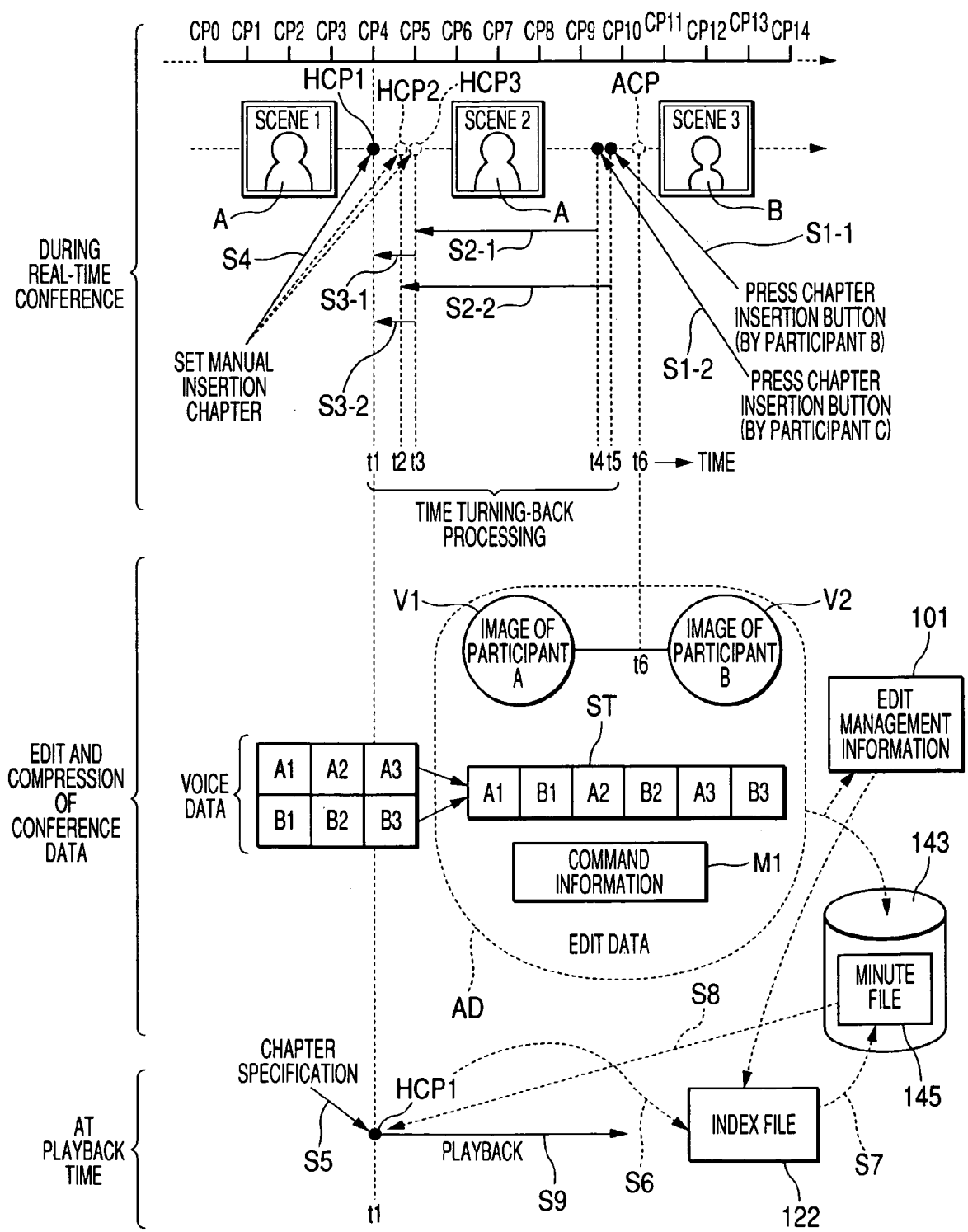
FIG. 3 is a drawing to describe the characteristic operation in the network conference system according to the first embodiment of the invention (heading setting operation, minute file edit operation, and minute file playback operation)

FIG. 3 is a drawing to describe the characteristic operation in the network conference system of the embodiment (heading setting operation, minute file edit operation, and minute file playback operation).

To begin with, the heading setting operation during a real-time conference (creation of index file) will be discussed.

CP0 to CP14 shown on the top of FIG. 3 are time separators (time chapters) provided at predetermined intervals (for example, 10-second intervals) on the time axis.

The time separators (time chapters) are used as the reference when a manually inserted heading (manual insertion chapter) is set.

The operation during the real-time conference is shown at the upper stage of FIG. 3.

As shown in the figure, the screen is switched from scene 1 to scene 2 to scene 3. Here, the presenter is A at the scene 2 and is changed to B at the scene 3.

The fact that the presenter is changed and that the page of the referenced document is changed needs to be recorded automatically. Therefore, an automatic insertion chapter ACP indicating the presenter change is set at time t6.

Assume that the presenter A makes an important statement at the scene 2. To set a heading (manual insertion chapter) in the important scene 2, participants B and C press chapter insertion buttons provided on their respective conference terminals (see FIG. 6) at times t4 and t5 (steps S1-1 and S1-2).

However, when the chapter insertion buttons are pressed, the important scene 2 already becomes the past.

Then, the conference server turns back the time by M seconds (for example, 30 seconds) from the times t4 and t5 (steps S2-1 and S2-2) and determines the turned-back times (t2 and t3).

If headings (manual insertion chapters) HCP2 and HCP3 are set at the turned-back times (t2 and t3) on the time axis, it is made possible to set a heading before the scene 2 at which the presenter A makes an important statement.

However, it is cumbersome to enable a heading to be set at any desired time on processing of hardware (the hardware load is heavy). If a large number of participants issue a heading insertion request all at once at slightly different timings, as many headings as the number of the heading insertion requests are set and the burden is also heavy from this point; it is also inefficient.

Therefore, preferably, time separators (time chapters) CP0 to CP14 are previously provided on the time axis at predetermined time intervals and when a heading insertion request occurs, the time is turned back by a predetermined time (for example, 30 seconds) and a heading is set in the part of the time separator (time chapter) just before the turned-back time.

That is, in FIG. 3, the time is further turned back from the time determined by turning back the time the predetermined time (time t2, t3) (step S3-1, S3-2) and heading (manual insertion chapter) is set at the time (time t1) of the time separator (time chapter) CP4 (step S4).

Accordingly, if a plurality of participants make a heading insertion request, the headings can be put together at one point in time (time).

Since it is determined on the system that a time separator (time chapter) is inserted at predetermined time intervals, the time separator (time chapter) is used as the heading setting reference, whereby the hardware load in setting the heading is also lessened.

The setup heading (manual insertion chapter) HCP1 (HCP2, HCP3), the automatic insertion chapter (chapter automatically inserted to record change such as presenter change and page change) ACP, and the time separators (time chapters) CP0 to CP14 are recorded in the index file 122 in the conference server 100.

An outline of the edit and compression operation of conference data is shown at the middle stage of FIG. 3.

Since the data amount of the real-time conference data file (multimedia data) 123 becomes enormous, the data amount is reduced to create a minute file 124 and the minute file 124 is saved.

Attention is focused on the fact that if voice information of a presenter exists, the conference description can be sufficiently understood if the moving image of the face of a participant does not exist. As for the image of each participant, only the images of important scenes (the image when the presenter starts presentation and the image when change occurs such as the images before and after the time at which the presenter is changed) are saved and other images are thinned out.

In FIG. 3, the presenter is changed from A to B at time t6 and thus images V1 and V2 before and after the time are saved.

As for pen input and motion of a cursor, control command information to control such motion (M1 in FIG. 3) rather than the moving image of the pen, etc., is saved. If the control command information is saved on the time series with time stamps added to the control command information, the locus of the pen, etc, can be later reproduced and therefore no problem arises.

As for voice data, voice stream data of the participants is merged into one stream and is saved. In FIG. 3, voice stream data A1, A2, A3 of the participant A and voice stream data B1, B2, B3 of the participant B are merged to create one stream data ST (A1, B1, A2, B2, A3, B3).

Although such voice merge processing is performed, if time stamp information and identification information of the participants are added, the voice stream of each user can be later reproduced and therefore no problem arises.

The image data after being subjected to the thinning-out processing (V1, V2), the provided voice stream data (ST), and the command information (M1) becomes edited data (edit data) AD.

As such edit processing is performed, the data amount of the minute file can be reduced drastically and the burden involved in communications and playback can be lessened.

To perform the edit processing, edit management information 101 is recorded so as to keep track of the correspondence between the real-time conference data (original data) and the edit data (AD).

The edit data (AD) is compressed using a predetermined archiver to create a minute file 145 and the minute file 145 is saved in minute storage 143.

Creation of the minute file as editing and compression are thus performed is executed automatically, so that saving in the time and labor for creating the minute file can be accomplished.

Next, the operation at the playback time of the minute file will be discussed.

An outline of the playback operation of the minute file is shown at the lower stage of FIG. 3.

When a request to play back the minute file 145 is transmitted from one conference terminal (140*a* to 140*n*) to the conference server 100, the playback control section 131 of the conference server 100 extracts heading information in the index file 122 (except for the time chapters), creates a heading list, and returns the heading list to the conference terminal issuing the playback request.

The user of the conference terminal references the heading list and specifies the heading of the information to be played back (step S5). Here, assume that the user specifies the manually inserted heading (manual insertion chapter) HCP1.

The playback control section 131 of the conference server 100 references the index file 122 (and the edit management information 101 as required) (step S6), accesses the minute file 145 (step S7), reads the part of the minute data corresponding to the specified heading, and transmits the read minute data to the conference terminal issuing the playback request (140*a* in FIG. 1) (step S8).

The minute file is played back on the conference terminal (step S9). The image of the presenter is played back as a still image.

Thus, in the network conference system of the embodiment, if one participant holds a feeling that one scene is important during the real-time conference, the participant sends a manual insertion request of heading from his or her conference terminal to the conference server, whereby the heading (manual insertion chapter) can be set at the appropriate point in time (namely, the time before the scene occurs).

The heading information thus set is managed using the index file. The heading information substantially serves as text minutes.

In the network conference system of the embodiment, the real-time conference data file is converted into the minute file to reduce the data size. Therefore, it becomes easy to save, transmit, and play back the conference data.

The user who wants to play back the minute file references the heading list and specifies a specific heading, whereby the part of the minute file corresponding to the specified heading can be played back. Therefore, very efficient and smooth playback is accomplished.

Figure 4:
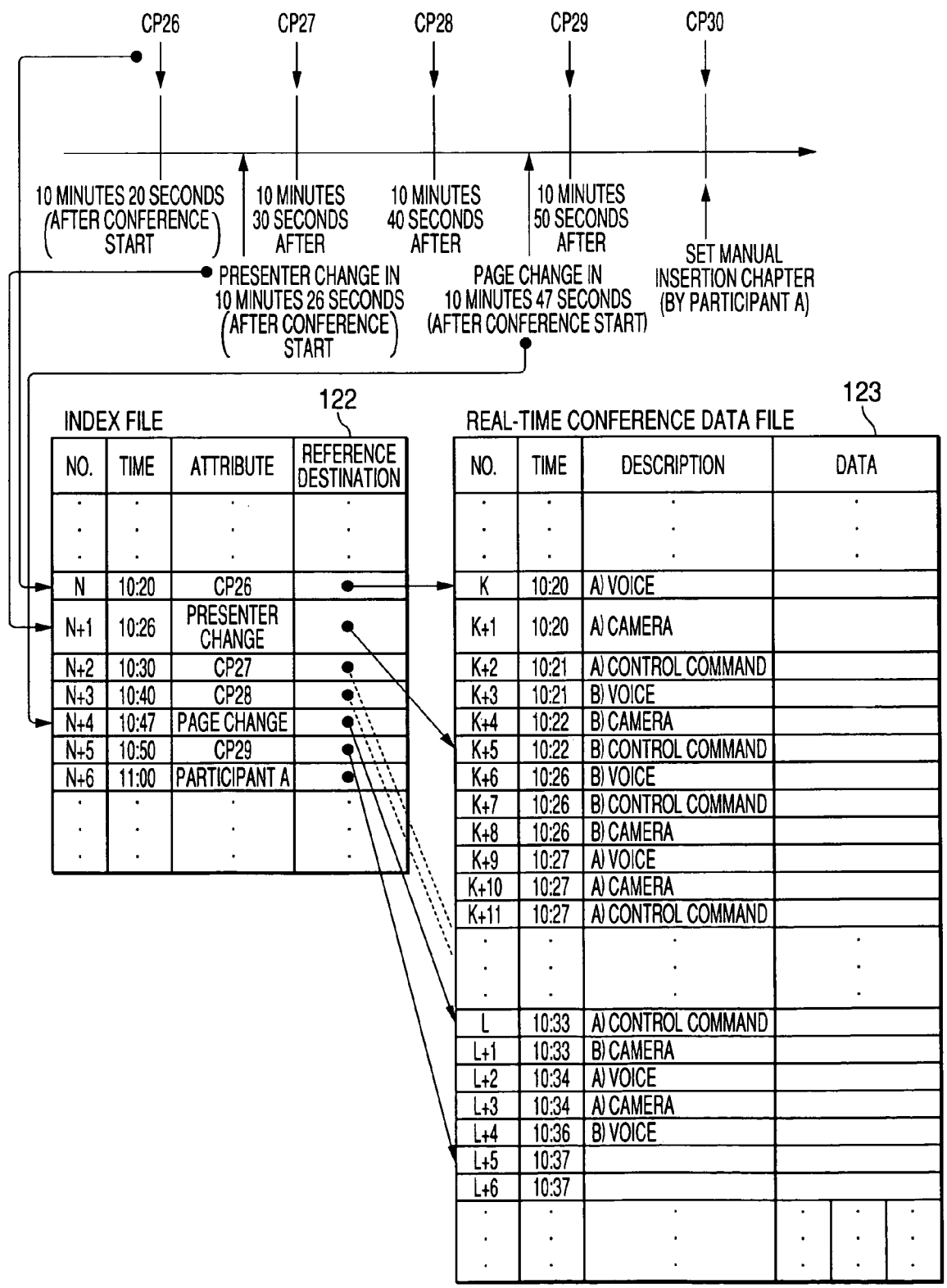
FIG. 4 is a drawing to describe the operation of recording time separators (time chapters), automatic insertion chapters (headings automatically inserted to record change such as presenter change and page change), and a manual insertion chapter (heading set based on the intention of each participant) in an index file and the correspondence between the index file and a real-time conference data file.

FIG. 4 is a drawing to describe the operation of recording time separators (time chapters), automatic insertion chapters (headings automatically inserted to record change such as presenter change and page change), and a manual insertion chapter (heading set based on the intention of each participant) in the index file and the correspondence between the index file and the real-time conference data file.

Time separators (time chapters) CP26 to CP29 are set at 10-second intervals as shown in the upper portion of FIG. 4. CP26 is set in 10 minutes 20 seconds after the conference start and CP27 to CP29 are set at 10-second intervals as shown in the figure.

Automatic insertion chapter ACP1 is set to record presenter change at the point in time when the time 10 minutes 26 seconds has elapsed since the conference start. Automatic insertion chapter ACP2 is set to record page change at the point in time when the time 10 minutes 47 seconds has elapsed since the conference start.

The participant A sets a manual insertion chapter in 11 minutes 00 seconds after the conference start (the time of the timer chapter CP30).

The contents of the index file 122 are shown in the lower left portion of FIG. 4.

As shown in the figure, the index file 122 records the numbers, the times, the attributes (event descriptions), and reference destination information (for example, information indicating the number of bytes counted from the top of the real-time conference data file 123) in a format in which they are associated with each other.

To record a time separator (time chapter), the number of the time separator (time chapter) like "CP26" is entered in the column ATTRIBUTE.

To record the automatic insertion chapter (ACP1, ACP2), the cause of inserting the automatic insertion chapter such as PRESENTER CHANGE or PAGE CHANGE is entered in the column ATTRIBUTE.

To record the manual insertion chapter (HCP1), the name of the user requesting the chapter insertion (here, PARTICIPANT A) is entered in the column ATTRIBUTE.

The real-time conference data file 123 is a file in a format in which the numbers, the times, the descriptions, and conference data are associated with each other, as shown in the lower right portion of FIG. 4.

The column DESCRIPTION indicates the type of saved information. Here, the description A) VOICE indicates the voice information of the participant A. A) CAMERA indicates the camera image information of the participant A. A) CONTROL COMMAND indicates control command information transmitted from the conference terminal of the participant A. Likewise, the description B) VOICE indicates the voice information of the participant B and so forth.

Thus, in the real-time conference data file 123, the data is placed on the time series according to the time stamps and various pieces of information produced at the times of the time stamps are classified according to the type and are recorded.

As the index file 122 is referenced, the real-time conference data file 123 can be accessed efficiently.

However, the real-time conference data file 123 is multimedia data and the data amount becomes enormous and thus the real-time conference data file 123 is not suited for save, transmission, or playback.

Figure 5:
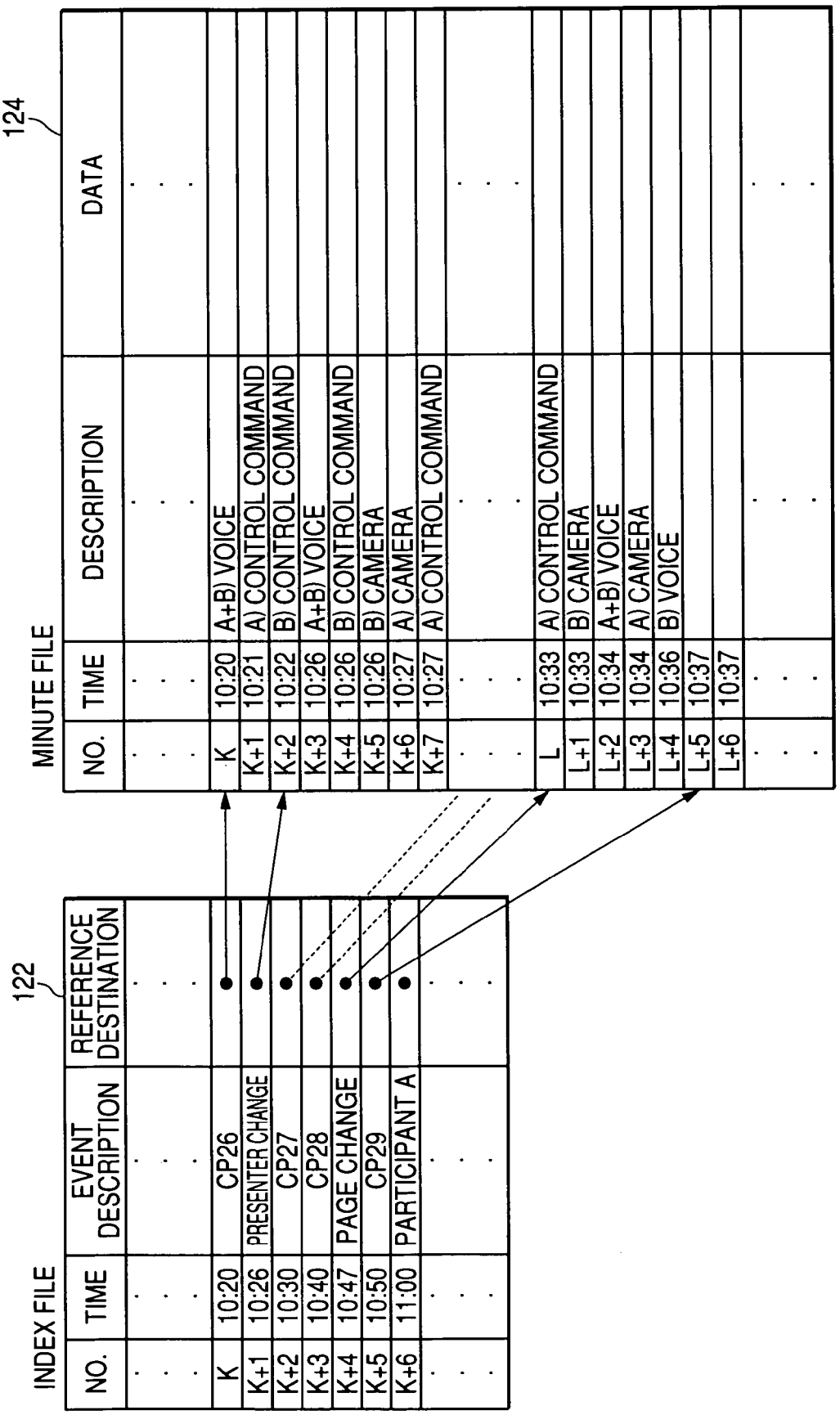
FIG. 5 is a drawing to describe the format of the minute file 124 and the correspondence between the index file and the minute file.

Then, the real-time conference data file 123 is converted into a minute file 124 and the minute file 124 is saved, as shown in FIG. 5.

FIG. 5 is a drawing to describe the format of the minute file 124 and the correspondence between the index file and the minute file.

In the minute file 124, the voice information of the participants A and B is merged and recorded, as shown on the right of FIG. 5. In FIG. 5, the merged voice data is represented as A+B) VOICE.

In the minute file 124, only when there is a change in the camera image, the images before and after the change are saved and other camera images are thinned out.

That is, a presenter change occurs (presenter from B to A) at the point in time (the NUMBERS K+1 of the index file 122) when the time 10 minutes 26 seconds has elapsed since the conference start.

Therefore, in the minute file 124, only the camera images before and after the presenter change occurred (namely, B) CAMERA and A) CAMERA with NUMBERS K+5 and K+6) are saved and the images at other points in time are thinned out (however, the image of the participant B at the beginning of the presentation start is saved).

The control command information is all saved.

The saved data is compressed using a predetermined archiver to reduce the data amount, as previously described with reference to FIG. 3.

The index file 122 (and the edit management information 101 as required), whereby the minute file 124 can be accessed efficiently.

Thus, according to the embodiment, the saved data amount of the minute file can be reduced effectively and the most of the heading information in the index file is used, whereby it is made possible to efficiently access the minute file. Therefore, the minute file can be saved reasonably and it is made possible to reference and play back the minute file smoothly and extremely efficiently.

Second Embodiment

Figure 6:
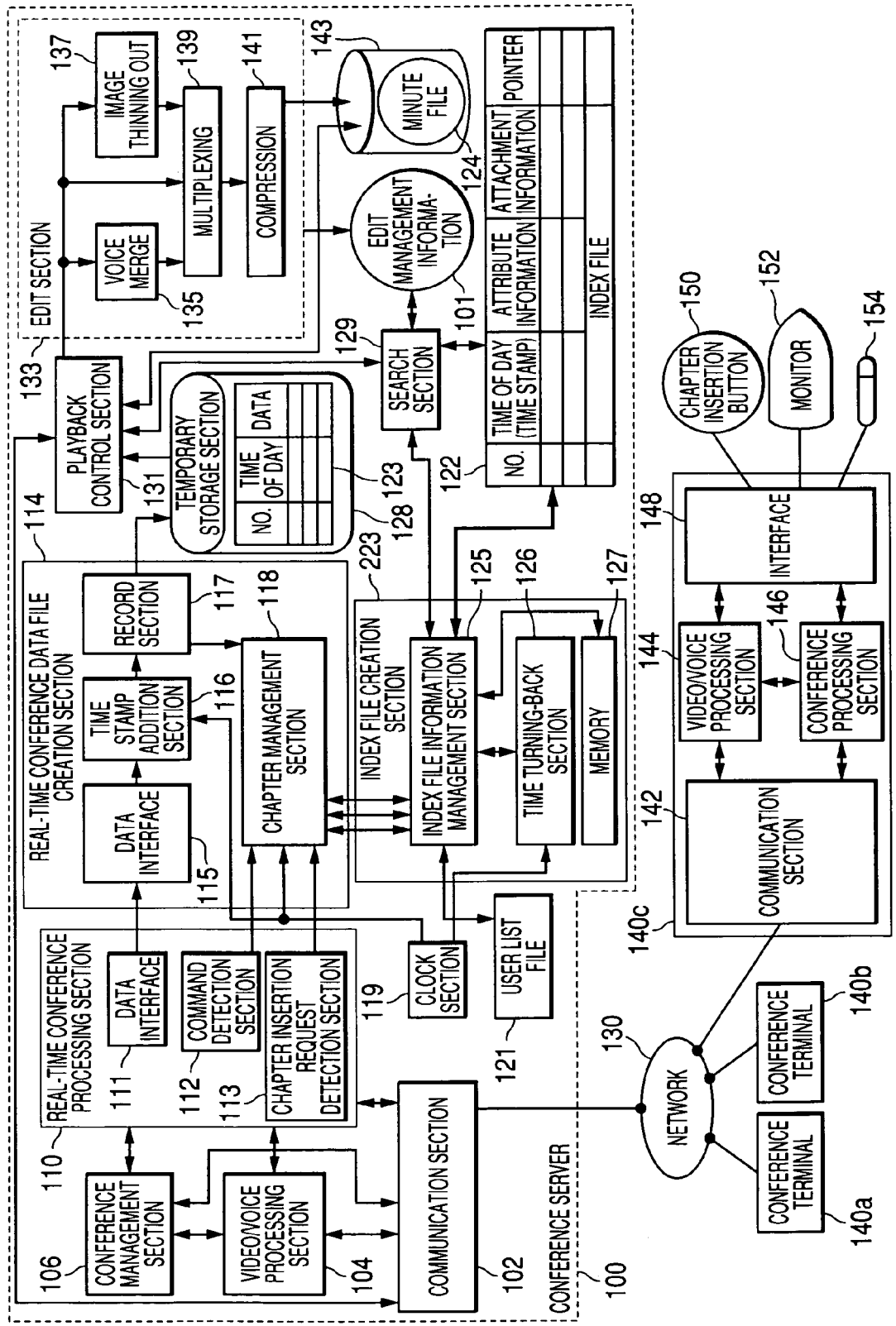
FIG. 6 is a block diagram to show the specific configuration of a network conference system (and sections making up the system) according to a second embodiment of the invention.

FIG. 6 is a block diagram to show the specific configuration of a network conference system (and sections making up the system) according to a second embodiment of the invention.

Parts identical with those previously described with reference to FIGS. 1 and 2 are denoted by the same reference numerals in FIG. 6.

A conference terminal 140c includes a communication section 142, a video/voice processing section 144, a conference processing section 146, an input/output interface 148, a chapter insertion button 150, a monitor 152, and a microphone 154, as shown in the lower portion of FIG. 6. In addition, a mouse to operate a point cursor and a camera for picking up the image of a participant are also provided although not shown in the figure. The configuration of another conference terminal (140a, 140b) is the same as that of the conference terminal 140c.

The conference terminals 140a to 140c are connected to a conference server 100 through a network 130.

The conference server 100 has a communication section 102, a video/voice processing section 104, a conference management section 106 for making a conference reservation, authenticating the participants, etc., a real-time conference processing section 110 (which has a data interface 111, a command detection section 112, and a chapter insertion request detection section 113), a real-time conference data file creation section 114 (which has a data interface 115, a time stamp addition section 116, a record section 117, and a chapter management section 118), a clock section 119, a user list file 121, an index file 122, an index file creation section 223 (which has an index file information management section 125, a time turning-back section 126, and memory 127), a temporary storage section 128 for temporarily storing a real-time conference data file 123, a search section 129 for searching the index file 122, a playback control section 131 for controlling playback of the real-time conference data file 123 and a minute file 124, and an edit section 133 for converting the real-time conference data file 123 into the minute file 124 (which has a voice merge processing section 135, an image thinning-out processing section 137, a voice information and video information multiplexing section 139, and a compression section 141 for compressing data using an archiver).

The search section 129 can reference edit management information 101 as required in searching.

The main functions of the sections of the conference server 100 are as follows:

The data interface 111 of the real-time conference processing section 110 transmits real-time conference data (multimedia data) to the real-time conference data file creation section 114.

The command detection section 112 detects a command for notifying a presenter change, a document page change, etc.

When a chapter insertion button 150 of one conference terminal (140a to 140n) is pressed and a heading (manual insertion chapter) setting request is issued, the chapter insertion request detection section 113 detects it.

The data interface 115 of the real-time conference data file creation section 114 receives real-time conference data sent from the real-time conference processing section 110, the time stamp addition section 116 adds a time stamp (time-of-day information) to the conference data, and the record section 117 records the conference data in the temporary storage section (disk) 128.

The chapter management section 118 generates the setting timings of time separators (time chapters), automatically inserted headings (automatic insertion chapters), and manually set headings (manual insertion chapters), and instructs the index file creation section 223 to set each chapter.

The index file information management section 125 in the index file creation section 223 manages various pieces of information to be recorded in the index file 122 in a unified manner and creates the index file. The time turning-back section executes "time turning-back processing" previously described with reference to FIG. 3. The memory 127 temporarily holds various pieces of information.

The index file 122 shown in FIG. 6 is including numbers, times (time stamps), attribute information, attachment information, and pointers.

The cause of a conference description change such as PRESENTER CHANGE or PAGE CHANGE is entered in the column ATTRIBUTE INFORMATION, previously described with reference to FIGS. 4 and 5. To set a manually inserted heading (manual insertion chapter), NAME OF PARTICIPANT first issuing the heading insertion request is entered.

Information attendant on ATTRIBUTE INFORMATION is entered in the column ATTACHMENT INFORMATION. For example, if ATTRIBUTE INFORMATION is PRESENTER CHANGE, the name of the new presenter after the change is entered. To set a manually inserted heading (manual insertion chapter), USER IDENTIFICATION FLAG is entered in the column ATTACHMENT INFORMATION.

When a plurality of heading setting requests are made for the same scene, the user identification flag is a flag for making it possible to identify all participants issuing the request. That is, each participant is assigned one flag bit. For example, if three participants A to C exist, the number of the flag bits are three and the bit corresponding to the user issuing a request for setting a manually inserted heading (manual insertion chapter) is set to "1" and other bits are set to "0." Accordingly, who wants to set a manually inserted heading (manual insertion chapter) can be recorded easily.

POINTER is information indicating the storage address of the real-time conference data corresponding to each chapter. That is, it is information indicating the location indicated by the number of bytes counted from the top of the real-time conference data file 123. Two pointers of video information pointer and voice information pointer are required.

When the conference is over, the playback control section 131 reads the real-time conference data file 123 stored in the temporary storage section 128 and passes the read file to the edit section 133.

The edit section 133 first separates the data in the real-time conference data file 123 into voice data and image data.

As for the voice information, voice data stream data for each participant is generated and then the voice merge processing section 135 merges the voice data stream data of the participants into one data stream.

As for the image data, the image thinning-out processing section 137 thins out images which need not be saved.

The multiplexing section 139 multiplexes the voice data and the image data and packages a plurality of files into one as required and the compression section 141 compresses the data using a predetermined archiver. Accordingly, a minute file 124 is created.

The minute file 124 is saved in minute storage 143.

After the conference is over, if a request for playing back the stored minute file 124 is issued from any of the conference terminals (140a to 140n), the playback control section 131 first instructs the search section 129 to search the index file 122 for chapters (automatic and manual insertion chapters) other than the time separators (time chapters), extracts the time-of-day information, the attribute information, and the attachment information, and creates a heading list.

The heading list is transmitted through the communication section 102 to the conference terminal (any of 140a to 140n) issuing the conference data playback request.

The heading list is displayed on the monitor 152 of the conference terminal (140a to 140n).

If the user of the conference terminal specifies a specific heading, the information corresponding to the heading is transmitted to the playback control section 131 of the conference server 100.

The playback control section 131 passes the specified heading information to the search section 129.

The search section 129 references the pointers (links) in the index file 122 (and the edit management information 101 as required), acquires access information indicating which part of the minute file 124 is to be accessed, and passes the acquired access information to the playback control section 131.

The playback control section 131 accesses the minute file 124 based on the access information, reads the real-time conference data corresponding to the specified heading, and transmits the real-time conference data to the conference terminal (140a to 140n).

Accordingly, any desired conference description is reproduced on the monitor 152 of the conference terminal.

Thus, the index file can be used to efficiently access the saved minute file 124, and the effective use of the file can be promoted.

Only the part corresponding to any desired heading can be played back and the data size is reduced as the data is edited and compressed, so that the system burden involved in data communications and playback is lessened.

Next, specific operation procedures of the network conference system in FIG. 6 will be discussed with reference to FIGS. 7 to 11.

Figure 7:
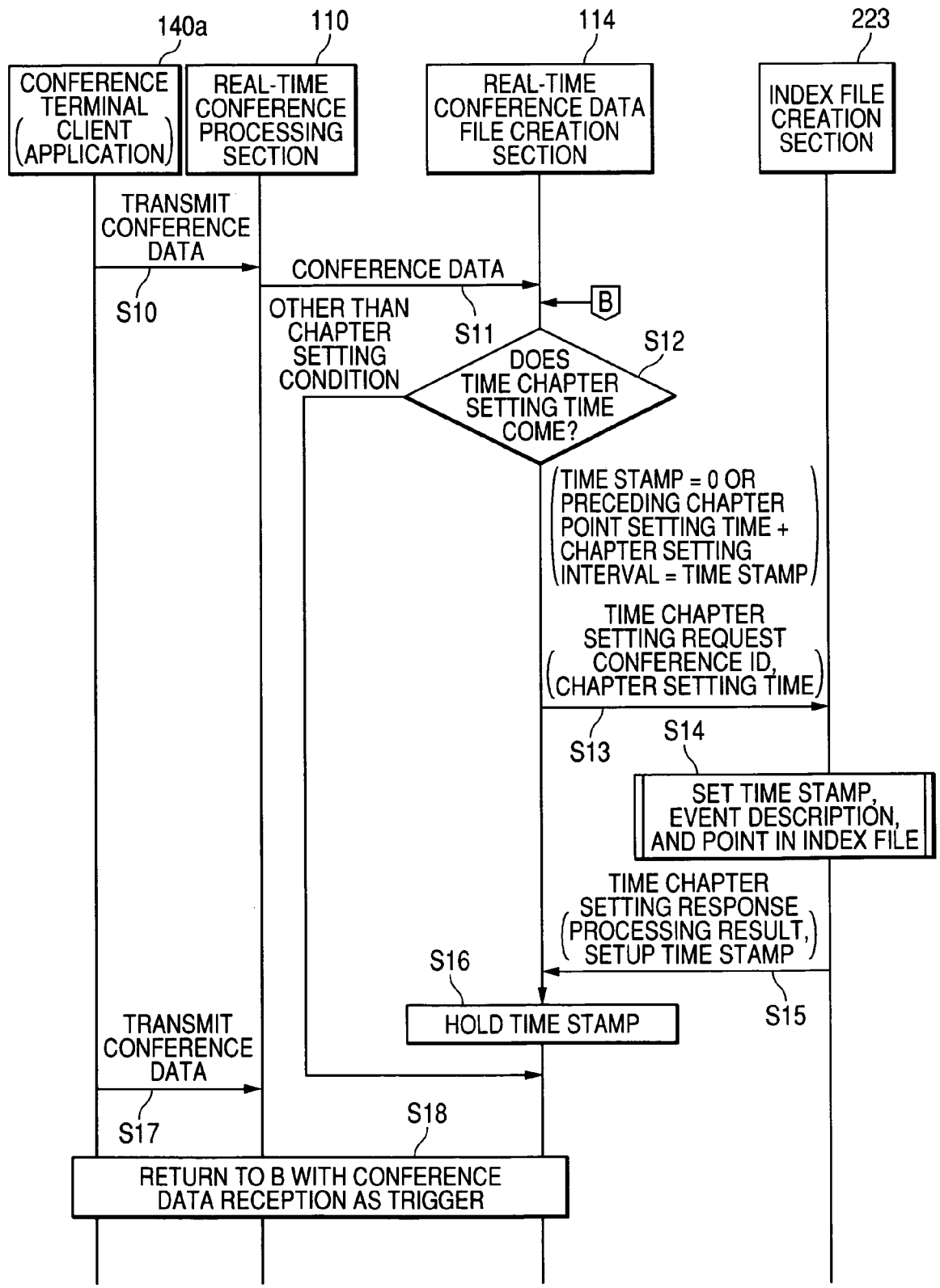
FIG. 7 is a timing chart to show a processing procedure for recording a time separator (time chapter) in the index file in the conference server of the network conference system shown in FIG. 6.

FIG. 7 is a timing chart to show a processing procedure for recording a time separator (time chapter) in the index file in the conference server of the network conference system shown in FIG. 6.

Conference data is transmitted at any time from each conference terminal (140a to 140c) (S10). The conference data is sent from the real-time conference processing section 110 to the real-time conference data file creation section 114 at any time (S11).

Real-time conference data with a time stamp is stored in the temporary storage section 128.

On the other hand, the chapter management section 118 of the real-time conference data file creation section 114 determines whether or not a time separator (time chapter) is to be recorded in the index file 122 (S12).

That is, the time separator (time chapter) is set at 10-second intervals from the conference start time and thus the chapter management section 118 references the time-of-day information output from the clock section 119 and determines whether or not the time separator (time chapter) setting time comes.

When the time separator (time chapter) setting time comes, the chapter management section 118 of the real-time conference data file creation section 114 issues a time chapter setting request (S13).

The index file information management section 125 of the index file creation section 223 adds new TIME STAMP (offset value from the conference start time), ATTRIBUTE INFORMATION, and POINTER to the index file 122 to update the index file 122 (S14).

The index file information management section 125 sends a time chapter setting response (containing the setting result, time stamp information indicating the setting time, etc.,) to the chapter management section 118 of the real-time conference data file creation section 114 (S15).

The chapter management section 118 of the real-time conference data file creation section 114 temporarily holds the time stamp information as the most recent time stamp information (S16).

Then, similar operation is repeated (S17 and S18).

Figure 8:
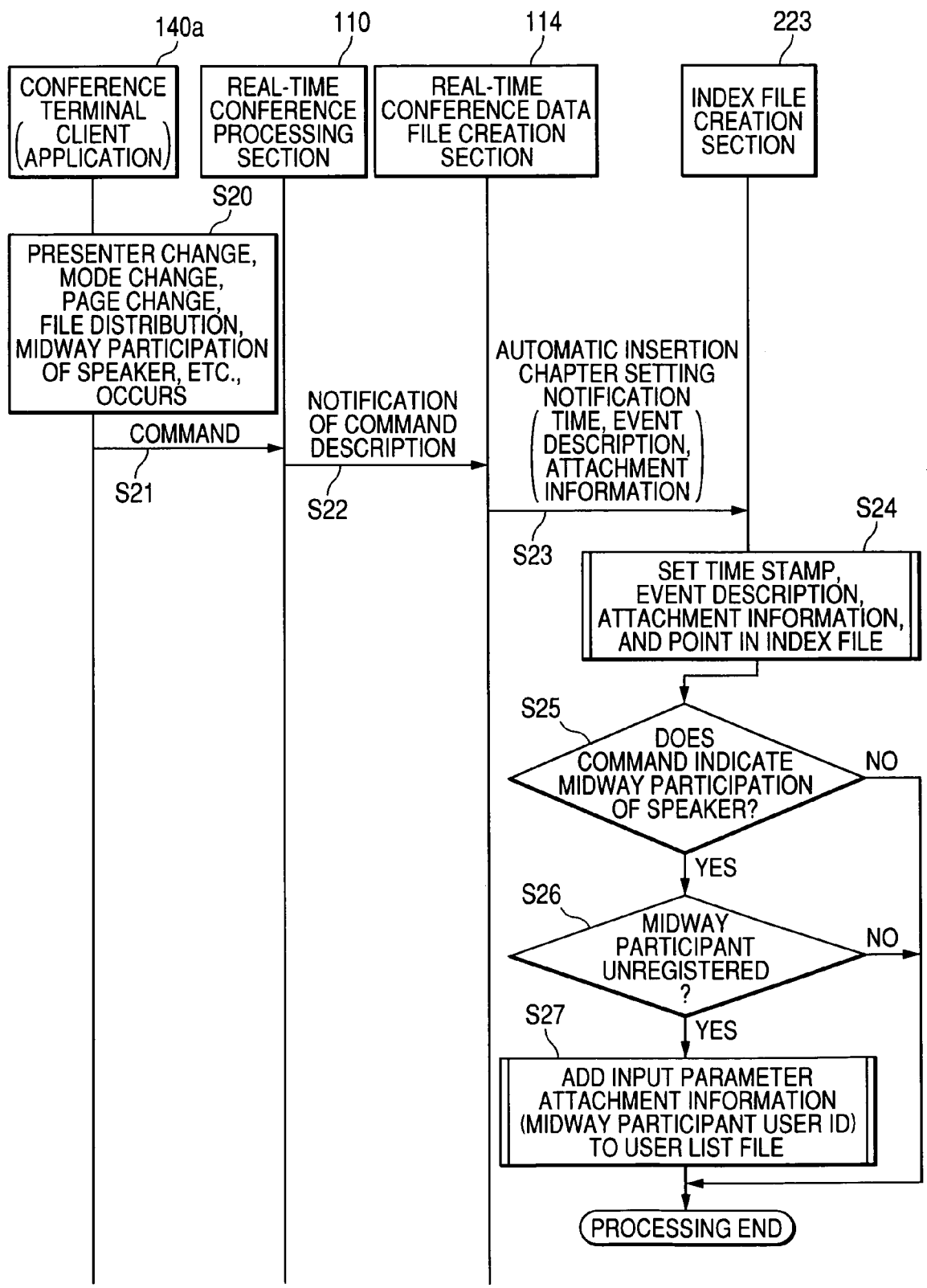
FIG. 8 is a timing chart to show a processing procedure for recording an automatically inserted heading (automatic insertion chapter) in the index file in the conference server of the network conference system shown in FIG. 6.

FIG. 8 is a timing chart to show a processing procedure for recording an automatically inserted heading (automatic insertion chapter) in the index file in the conference server of the network conference system shown in FIG. 6.

If an event such as a presenter change, a system mode change, a page change, file distribution, or midway participation of speaker occurs (S20), a command indicating the event is sent from the conference terminal (140a to 140c) to the real-time conference processing section 110 of the conference server 100 (S21) and subsequently the description of the command is sent to the real-time conference data file creation section 114 (S22).

Next, the chapter management section 118 of the real-time conference data file creation section 114 sends a setting notification of an automatic insertion chapter (containing time stamp, event description, and attachment information) to the index file creation section 223 (S23).

The index file information management section 125 of the index file creation section 223 adds new TIME STAMP (offset value from the conference start time), ATTRIBUTE INFORMATION, ATTACHMENT INFORMATION, and POINTER to the index file 122 to update the index file 122 (S24).

Next, whether or not the current command is a command indicating midway participation of speaker is checked (S25) and whether or not the midway participant is unregistered in the user list file 121 is checked (S26). If the midway participant is unregistered, the identification number (ID) of the midway participant is added to the user list file 121 (S27).

Figure 9:
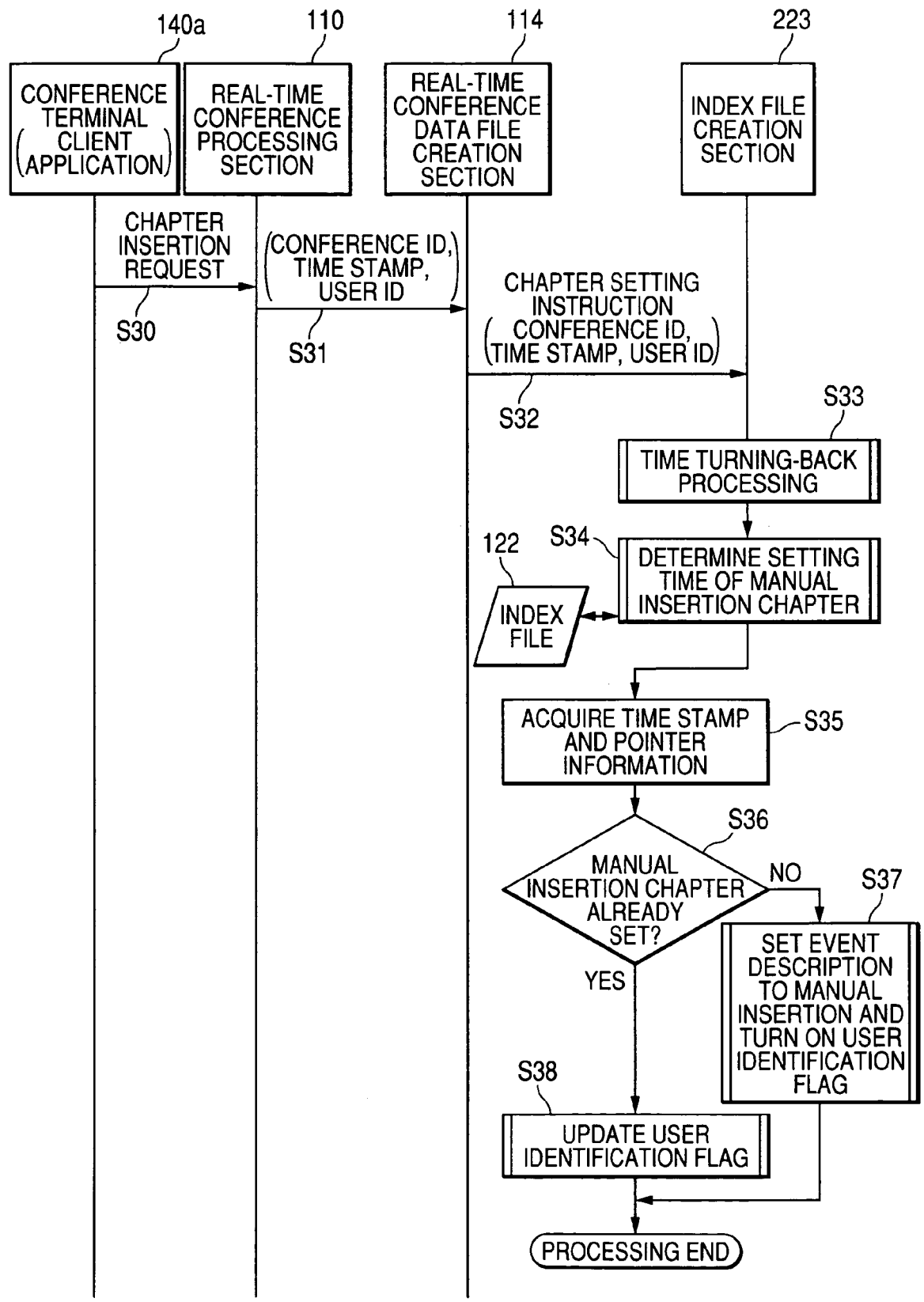
FIG. 9 is a timing chart to show a processing procedure for recording a manually inserted heading (manual insertion chapter) in the index file in the conference server of the network conference system shown in FIG. 6.

FIG. 9 is a timing chart to show a processing procedure for recording a manually inserted heading (manual insertion chapter) in the index file in the conference server of the network conference system shown in FIG. 6.

If a participant (for example, chairperson) determines that the scene is an important scene during the conference, the participant presses the chapter insertion button 150. As the chapter insertion button 150 is pressed, a request for setting a manually inserted heading (manual insertion chapter) is transmitted from the conference terminal (140a to 140c) to the conference server 100 (S30).

A notification that the request occurred is sent from the real-time conference processing section 110 to the real-time conference data file creation section 114 (S31).

The chapter management section 118 of the real-time conference data file creation section 114 instructs the index file creation section 223 to set a manually inserted heading (manual insertion chapter) (S32).

The time turning-back section 126 of the index file creation section 223 turns back the time a given time (for example, 30 seconds) on the time axis (S33), namely, performs subtraction processing of the given time from the current time-of-day information.

The index file information management section 125 determines the time separator (time chapter) immediately preceding the point in time when the time was turned back and accordingly determines the setting time of the manually inserted heading (manual insertion chapter) (S34).

At this time, the index file information management section 125 references the index file 122.

Subsequently, the information of the setting time of the manually inserted heading (manual insertion chapter) (time stamp and pointer) is acquired (S35).

Subsequently, whether or not another manual insertion chapter is already set at the point in time when the manually inserted heading (manual insertion chapter) is about to be set is checked (S36). The reason why the check is made is that such a situation is assumed if a plurality of participants issue a heading setting request at slightly different timings.

If another manually inserted heading (manual insertion chapter) is already set, it means that a plurality of users issue the heading insertion request. In this case, the bit of each corresponding user, of the user identification flag recorded in the column ATTACHMENT INFORMATION of the index file 122 is changed from "0" to "1" (accordingly, information as to who the heading setting requester is, is added), and the index file 122 is overwritten for update (S38).

If the check result at S36 is NO, EVENT DESCRIPTION in the index file 122 is set to MANUAL INSERTION and to identify the user issuing the heading setting request, the identification flag bit of the user is changed from "0" to "1" (S37).

The index file 122 is thus updated.

The configuration, the operation, and the procedures for updating the index file at any time have been described, but various modifications of the invention can be made.

For example, the conference client application may be a dedicated application or may be an application operating on a WEB browser.

The real-time conference data file may be a single file or may be including division files. However, as the file is divided into a plurality of files, it is made possible to read and write one file easily and rapidly.

The portion for storing the real-time conference data may exist in a different server from the conference server. In this case, however, it becomes necessary to transfer control information between the conference server and the different server.

As for the format of the index file, recording the time-of-day information (time stamp) may be suppressed to decrease the data amount, or information supplementary to the event description may be added for making it possible to access the real-time conference data file more precisely. A technique of giving the identification number proper to the conference to the index file for management may be adopted.

For the conference participant to set a manually inserted heading (manual insertion chapter), the turn-back amount to turn back the time on the time axis can also be adjusted in response to the time during which the chapter insertion button is pressed, the number of times the chapter insertion button has been pressed per unit time, etc. In this case, the ease-of-use of the system is furthermore improved.

Next, the operation of converting the real-time conference data file into a minute data file will be discussed with FIG. 10.

Figure 10:
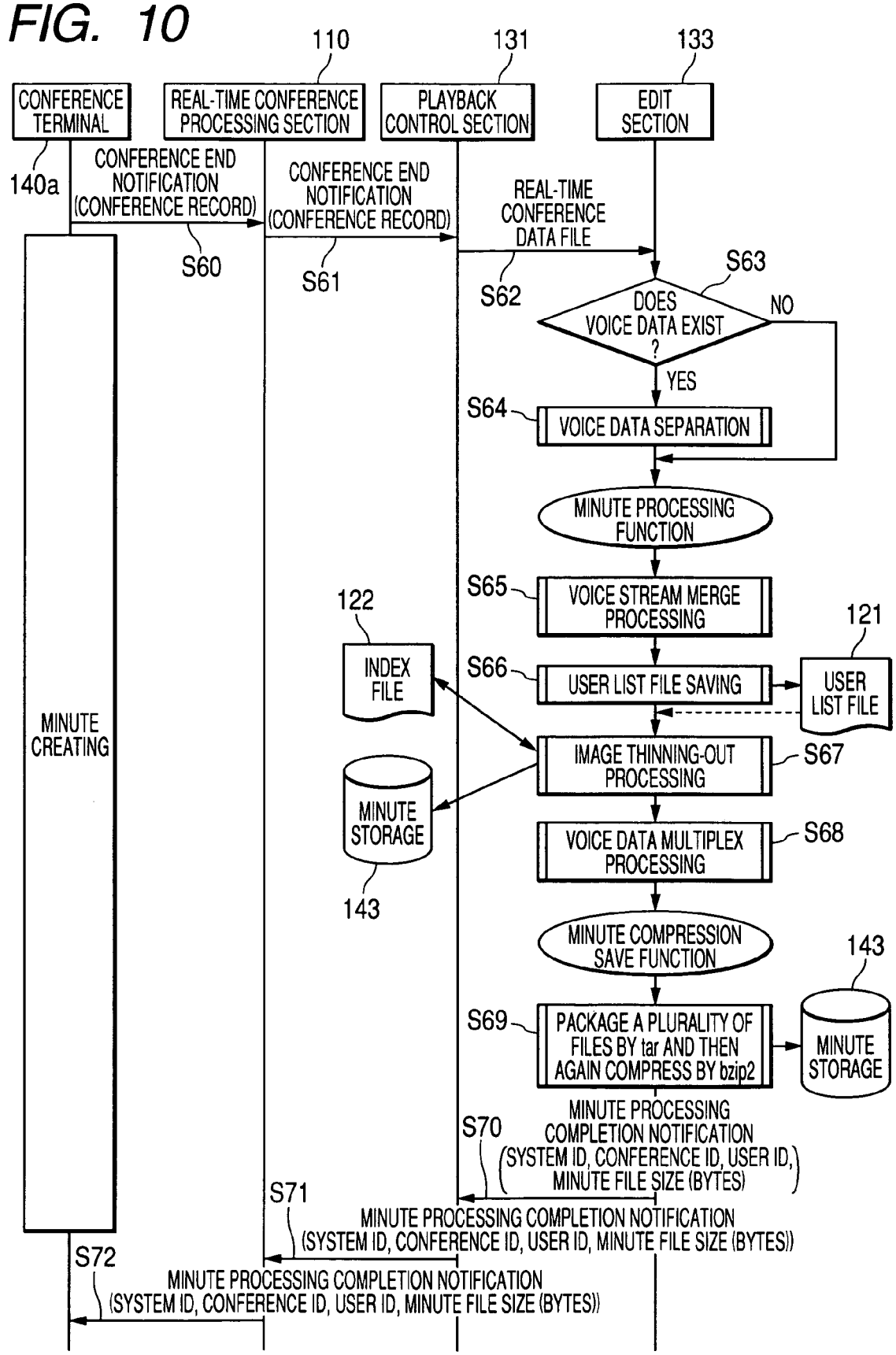
FIG. 10 is a flowchart to show a specific procedure of the minute data file creation operation (edit operation of converting a real-time conference data file into a minute data file) in the conference server of the network conference system shown in FIG. 6.

FIG. 10 is a flowchart to show a specific operation procedure of the minute data file creation operation (operation of converting the real-time conference data file into a minute data file).

When the conference is over, a conference end notification is sent from one conference terminal (140*a* to 140*n*) to the real-time conference processing section 110 of the conference server 100 (S60).

The status of the conference terminal (client application) is set to minute creating. This status continues until a minute processing completion notification is received from the conference server 100.

Likewise, a conference end notification is sent from the real-time conference processing section 110 to the playback control section 131 (S61).

The playback control section 131 reads the real-time conference data file 123 stored in the temporary storage section 128 and sends the read file to the edit section 133.

The edit section 133 is provided with a minute creation function. The edit section 133 first detects voice data (S63) and separates the voice data (S64).

Next, a minute processing function is provided and the voice merge processing section 135 performs merge processing of voice stream data. A specific procedure of the merge processing is as follows: When the voice data is encoded, decode processing is performed. Next, voice data stream data for each participant is created based on user ID information (given by the client application of each conference terminal) and time stamp information of the voice data (sequential number information). Next, the voice data streams of the participants are merged into one voice data stream data.

Next, a user list file is saved (S66).

Next, the image thinning-out processing section 137 performs image file thinning-out processing (S67). At this time, the image thinning-out processing section 137 references the index file 122, acquires the time stamp information (time-of-day information) at any other chapter point than time chapters (namely, automatically inserted heading setting time, manually inserted heading setting time), saves only the image data at the time of the time stamp or at the times before and after the time stamp, and thins out any other image data.

Next, the voice data after being subjected to the merge processing is multiplexed on the image data after being subjected to the thinning-out processing (S68).

Next, a minute compression function is provided. For example, as archivers for minute compression, a tape archiver (tar) included in Linux and bzip2 are used.

The conditions of the archivers to be used are as follows: The archiver can also be used with the OS adopted in the conference server 100; compression files will be able to be unarchived in the future; the domestic and oversea penetration rates of the archiver are not prejudiced; the archiver is supported by wide-ranging vendors; and the like.

The tape archiver (tar) is an archiver having a function of packaging a plurality of files, but does not have a compression function. Therefore, a plurality of files are packaged into one by tar and then compressed by bzip2 (S69). Archiver gzip may be used to compress a plurality of files at the same time.

The minute file 124 thus created is saved in the minute storage 143.

After the minute file 124 is created, the real-time conference data file 123 stored in the temporary storage section 128 becomes unnecessary and thus is erased for releasing the storage area of the temporary storage section 128.

Upon completion of minute creation, the edit section 133 sends a minute processing completion notification to the playback control section 131 (S70). Likewise, a minute processing completion notification is sent from the playback control section 131 to the real-time conference processing section 110 (S71) and a minute processing completion notification is sent from the real-time conference processing section 110 to the conference terminal (140*a* to 140*c*) (S72).

Accordingly, the status MINUTE CREATING in the client application of the conference terminal (140*a* to 140*c*) is terminated.

Next, an operation procedure for playing back the saved minute file will be discussed.

Figure 11:
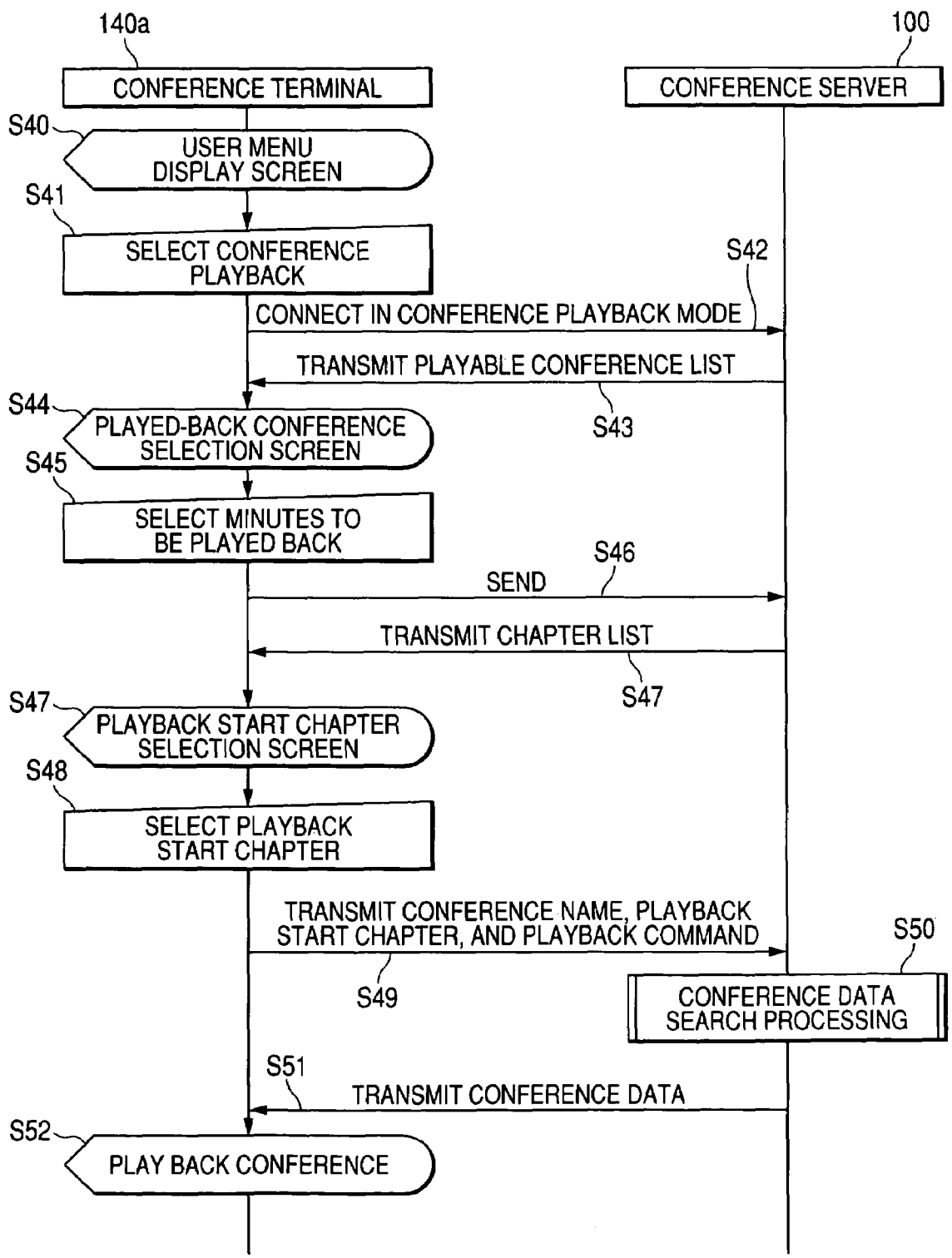
FIG. 11 is a flowchart to show an operation procedure for playing back the saved minute file on a conference terminal in the network conference system in FIG. 6.

FIG. 11 is a flowchart to show the operation procedure for playing back the saved minute file on the conference terminal in the network conference system in FIG. 6.

The user of one conference terminal (140*a* to 140*c*) displays a menu on the monitor 152 (see FIG. 6) (S40) and selects CONFERENCE PLAYBACK (S41).

The conference terminal is connected to the conference server 100 in a conference playback mode (S42).

The playback control section 131 of the conference server 100 first transmits a playable conference list to the conference terminal (S43).

The conference list is displayed on the monitor 152 on the conference terminal (S44) and when the user selects the conference to be played back (S45), identification information of the selected conference is sent to the conference server 100 (S46).

Upon reception of the identification information, the playback control section 131 of the conference server 100 instructs the search section 129 to search the index file 122 for necessary heading information (namely, information of automatically inserted headings (automatic insertion chapters) and manually inserted headings (manual insertion chapters) except time chapters), creates a list of the found information, and transmits a list of the headings to the conference terminal (S47).

The user displays the heading list on the monitor 152 (S47) and selects one heading out of the heading list (S48).

Then, the conference name, the heading (chapter) to be played back, and a playback command are transmitted from the conference terminal to the conference server 100 (S49).

The playback control section 131 of the conference server 100 references the pointer (link information) in the index file 122 (and references the edit management information 101 as required), searches the minute file 124 saved in the minute storage 143, and reads the corresponding part of the minute data (S50).

Next, the read minute data (conference data) is transmitted to the conference terminal (S51).

The minute file corresponding to any desired heading is played back on the conference terminal (S52).

Thus, the most of the index file is made, whereby it is made possible to easily access the saved minute file and the effective use of the minute data is promoted.

The index file is updated at any time during the progress of the conference and a list of the headings extracted from the index file serves as minutes, so that saving in the time and labor for creating the minutes can be accomplished.

Various modifications of the configuration and the operation to play back the real-time conference data can be made.

For example, in FIG. 11, first a conference list is transmitted and next a heading list is transmitted, but the lists may be transmitted at the same time.

A heading list may be created by extracting only the headings relevant to a specific event or only the headings set by a specific participant.

If a plurality of participants want to set a heading (chapter) for the same scene, it is considered that the importance of the scene is high. Therefore, only the headings satisfying the condition that the number of users wanting to set a heading exceeds a predetermined threshold value may be extracted to create a heading list.

As for the minute file transmission technique from the conference server to the conference terminal, a technique of executing burst transmission of data in the minute file from the conference server and playing back the conference on the conference client as the time stamps may be adopted.

It can also be made possible to again display the heading list on the conference terminal during playback of the minute file and specify a new conference playback start point. In doing so, only the parts that the users want to see (the parts of the headings that the users want to see) can be played back one after another on the conference terminal, and efficient playback is realized.

As described above, according to the embodiments, the real-time conference data (multimedia data) is edited to create a minute file and the minute file is saved, so that the saved data amount of the file can be decreased exceptionally. Accordingly, the burden involved in data communications and playback can be lessened. Creation of the minute file as editing is thus performed is executed automatically, so that saving in the time and labor for creating the minute file can be accomplished.

The index file enables efficient access to the minute file, so that the use efficiency of the minute file can be enhanced. A list of the heading information contained in the index file substantially serves as (text information) minutes, so that saving in the time and labor for creating the minutes can be accomplished. Necessary data can be rapidly accessed simply by specifying any desired heading and moreover the data size of the read data is reduced as the data is edited, so that the burden involved in transmission and playback is lessened exceptionally.

Manually inserted heading setting is made possible, so that the heading information contained in the index file can also be enriched. The heading information is used, whereby it is made possible to efficiently access the minute file.

In the network conference system according to the embodiments of the invention, the minute file can be saved reasonably and the minute file can be referenced and played back smoothly and extremely efficiently. Therefore, the ease-of-use of the system is improved.

Thus, according to the embodiments of the invention, the data amount of the minutes of multimedia information can be reduced efficiently, the burden of transmission to a remote location can also be lessened, automatic creation of the minute file and efficient access to the minute file can be realized, and the ease-of-use of the network conference system can be improved.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A network conference system comprising:
   a conference server; and
   a client conference terminal connected to the conference server through a network,
   wherein the conference server includes a data storage section and a playback control section,
   wherein the data storage section includes:
   a real-time conference data file creation section for adding a time stamp to conference data comprising voice data, image data, and control command data of a real-time conference held using a network conference system, and placing, based on the time stamp added to the conference data, the conference data to which the time stamp was added on a time series to create a real-time conference data file, wherein heading information is based on the time stamp added to the conference data;

an index file creation section for creating an index file including time-of-day information and heading information associated with the time-of-day information concurrently with creation of the real-time conference data file; and a conference data edit section for reading the temporarily stored real-time conference data file after the real-time conference is over to create a minute file, wherein the playback control section, upon reception of a request for playing back the minute file from the client conference terminal, creates a heading list based on the heading information in the index file, and transmits the heading list to the client conference terminal, and wherein the playback control section, when a user of the client conference terminal specifies a specific heading, among the heading list, as the result of referencing the heading list, reads data in the minute file corresponding to the specified heading by referring to the index file, and transmits the read data to the client conference terminal.

2. A conference server used in a server-client network conference system, the conference server comprising:

a data storage section; and a playback control section, wherein the data storage section includes:

a real-time conference data file creation section for adding a time stamp to conference data comprising voice data, image data, and control command data of a real-time conference held using a network conference system, and placing, based on the time stamp added to the conference data, the conference data to which the time stamp was added on a time series to create a real-time conference data file, wherein heading information is based on the time stamp added to the conference data;

an index file creation section for creating an index file including time-of-day information, and heading information associated with the time-of-day information concurrently with creation of the real-time conference data file; and a conference data edit section for reading the temporarily stored real-time conference data file after the real-time conference is over to create a minute file, wherein the playback control section, upon reception of a request for playing back the minute file from a client conference terminal, creates a heading list based on the heading information in the index file, and transmits the heading list to the client conference terminal, and wherein the playback control section, when a user of the client conference terminal specifies a specific heading, among the heading list, as the result of referencing the heading list, reads data in the minute file corresponding to the specified heading by referring to the index file, and transmits the read data to the client conference terminal.

3. A minute file management method comprising:

adding a time stamp to conference data comprising voice data, image data, and control command data of a real-time conference held using a network conference system;

placing, based on the added time stamp, the conference data to which the time stamp is added on a time series to create a real-time conference data file;

temporarily storing the real-time conference data file;

creating an index file including time-of-day information and heading information associated with the time-of-day information while the real-time conference data file is created, wherein heading information is based on the time stamp added to the conference data;

reading the temporarily stored real-time conference data file after the real-time conference is over to create a minute file;

storing the created minute file; and managing access to the minute file using the index file.

4. The minute file management method as claimed in claim 3, wherein the heading information in the index file contains first heading information automatically inserted to record a conference description change in the real-time conference and second heading information manually inserted based on an intention of each participant of the real-time conference.

5. The minute file management method as claimed in claim 3, further comprising: displaying a list of the heading information from the index file on a display device; allowing a user to select a piece of the heading information from among the list; and starting to playback the minute file from a time point corresponding to the time stamp of the selected piece of the heading information.

6. The minute file management method as claimed in claim 3, further comprising: packaging the voice data of participants of the real-time conference into a single stream; executing image thinning-out processing of the image data of the participants; and compressing the packaged single stream, the image data subjected to the image thinning-out processing, and the control command data to create the minute file.

7. A method of recording a multimedia conference and managing the recorded multimedia conference, the method comprising:

recording, in real-time, a multimedia conference as conference data comprising voice data, image data, and control command data, periodically inserting time stamps in the conference data while the multimedia conference is recorded;

automatically detecting, while recording the multimedia conference, at least one scene change in the multimedia conference and a time of the scene change;

storing, in an index file separate from the conference data, the automatically detected time of the at least one scene change as a first chapter title of the recorded conference data;

receiving, from a participant of the multimedia conference, at least one request to insert a second chapter title in the recorded conference data, wherein the at least one request is received while the conference data is being recorded;

determining a time the at least one request was received;

adjusting the determined time based on the periodically inserted time stamps in the conference data;

storing in the index file the adjusted time as the second chapter title of the conference data; and managing access to the recorded conference data based on at least the first chapter title and the second chapter title stored in the index file.

* * * * *